United States Patent
Lee et al.

(10) Patent No.: US 6,837,687 B2
(45) Date of Patent: Jan. 4, 2005

(54) FOIL FORMED STRUCTURE FOR TURBINE AIRFOIL

(75) Inventors: Ching-Pang Lee, Cincinnati, OH (US); Melvin Robert Jackson, Niskayuna, NY (US); Stephen Joseph Ferrigno, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,145

(22) Filed: Dec. 20, 2001

(65) Prior Publication Data

US 2003/0118445 A1 Jun. 26, 2003

(51) Int. Cl.$^7$ .............................. F01D 5/18; F01D 5/28
(52) U.S. Cl. ................ 416/224; 416/97 R; 416/229 A; 416/241 R
(58) Field of Search .............................. 416/96 R, 96 A, 416/97 R, 92, 90 R, 224, 229 A, 241 R, 241 B; 415/115, 116, 173.1, 173.4, 173.5

(56) References Cited

U.S. PATENT DOCUMENTS

| | | | |
|---|---|---|---|
| 3,423,069 A | * | 1/1969 | Chandley ..................... 416/92 |
| 4,064,300 A | | 12/1977 | Bhangu |
| 4,142,824 A | | 3/1979 | Andersen |
| 4,447,391 A | * | 5/1984 | Mizuhara ..................... 420/456 |
| 4,501,053 A | * | 2/1985 | Craig et al. ................ 416/97 R |
| 5,295,530 A | | 3/1994 | O'Connor et al. |
| 5,368,441 A | | 11/1994 | Sylvestro et al. |
| 5,427,866 A | | 6/1995 | Nagaraj et al. |
| 5,626,462 A | | 5/1997 | Jackson et al. |
| 5,733,102 A | * | 3/1998 | Lee et al. .................. 416/97 R |
| 6,164,914 A | * | 12/2000 | Correia et al. ............. 416/97 R |
| 6,213,714 B1 | | 4/2001 | Rhodes |
| 6,224,336 B1 | * | 5/2001 | Kercher ..................... 416/97 R |
| 6,224,337 B1 | * | 5/2001 | Lieland et al. ............. 416/97 R |
| 6,551,063 B1 | * | 4/2003 | Lee et al. .................. 416/97 R |
| 2002/0187044 A1 | * | 12/2002 | Lee et al. .................. 416/97 R |

FOREIGN PATENT DOCUMENTS

JP          1-53002 A   *   3/1989    ................. 416/95

* cited by examiner

Primary Examiner—Christopher Verdier
(74) Attorney, Agent, or Firm—Adams Evans P.A.; David L. Narciso

(57) ABSTRACT

An airfoil body having a first wall including a plurality of ribs. An outer wall formed of a high temperature foil is attached to the ribs so as to form a plurality of channels. The first wall is protected from hot flowpath gases by the outer wall and by cooling air flowing through the channels.

7 Claims, 2 Drawing Sheets

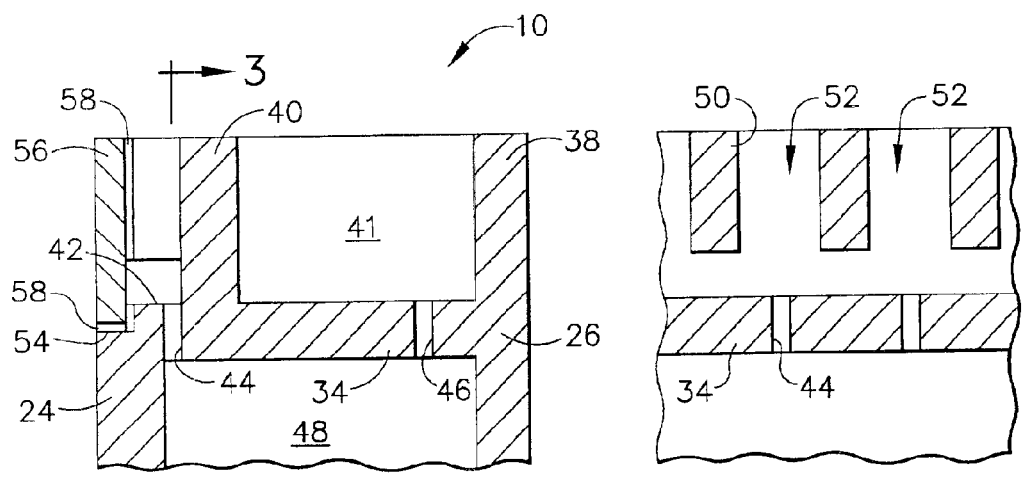
FIG. 2
FIG. 3
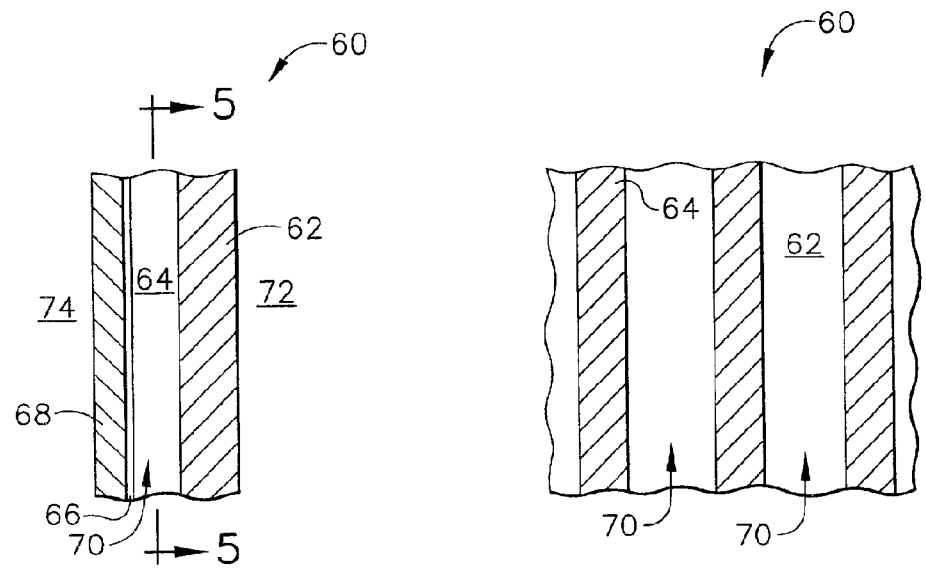
FIG. 4
FIG. 5

FOIL FORMED STRUCTURE FOR TURBINE AIRFOIL

BACKGROUND OF THE INVENTION

This invention relates generally to gas turbine engines and more particularly to gas turbine engine components formed in part from high temperature foil materials.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

Gas turbine engine hot section components, in particular the high pressure turbine section components, operate at extremely high temperatures and need to be cooled to have acceptable longevity. The tips of high pressure turbine (HPT) blades in particular are susceptible to high temperatures. The cooling is typically provided by extracting relatively cool air from an upstream location of the engine and routing the cooling air to components where it is needed. Conventionally the components to be cooled are hollow and have provisions for receiving and distributing the cooling air by various methods, for example the components may be film cooled by providing a plurality of passages which eject a blanket of cooling air over the surface of the component, or the components may be convectively cooled by causing the air to flow through various internal passages. Convection cooling can be implemented by using a very thin wall spaced apart from a substrate to provide a flow channel for cooling air. Very thin walls cast from conventional superalloys require increased cooling air flow to ensure the longevity of the walls, which reduces the overall efficiency of the engine cycle. Materials having better high temperature properties than conventional superalloys are available. However, their increased density and cost relative to conventional superalloys discourages their use for the manufacture of complete gas turbine components.

Accordingly, there is a need for gas turbine engine components able to withstand higher temperatures without excessive use of cooling air.

BRIEF SUMMARY OF THE INVENTION

The above-mentioned need is met by the present invention, which provides an airfoil body having a first wall including a plurality of ribs. An outer wall formed of a high temperature foil is attached to the ribs so as to form a plurality of channels. The first wall is protected from hot flowpath gases by the outer wall and by cooling air flowing through the channels.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 2 is a cross-sectional view of the tip section of the turbine blade of FIG. 1.

FIG. 3 is a view taken along lines 3—3 of FIG. 2.

FIG. 4 is a schematic sectional view of an airfoil wall structure constructed in accordance with the present invention.

FIG. 5 is a view taken along lines 5—5 of FIG. 4.

DETAILED DESCRIPTION OF THE INVENTION

Figure 1:
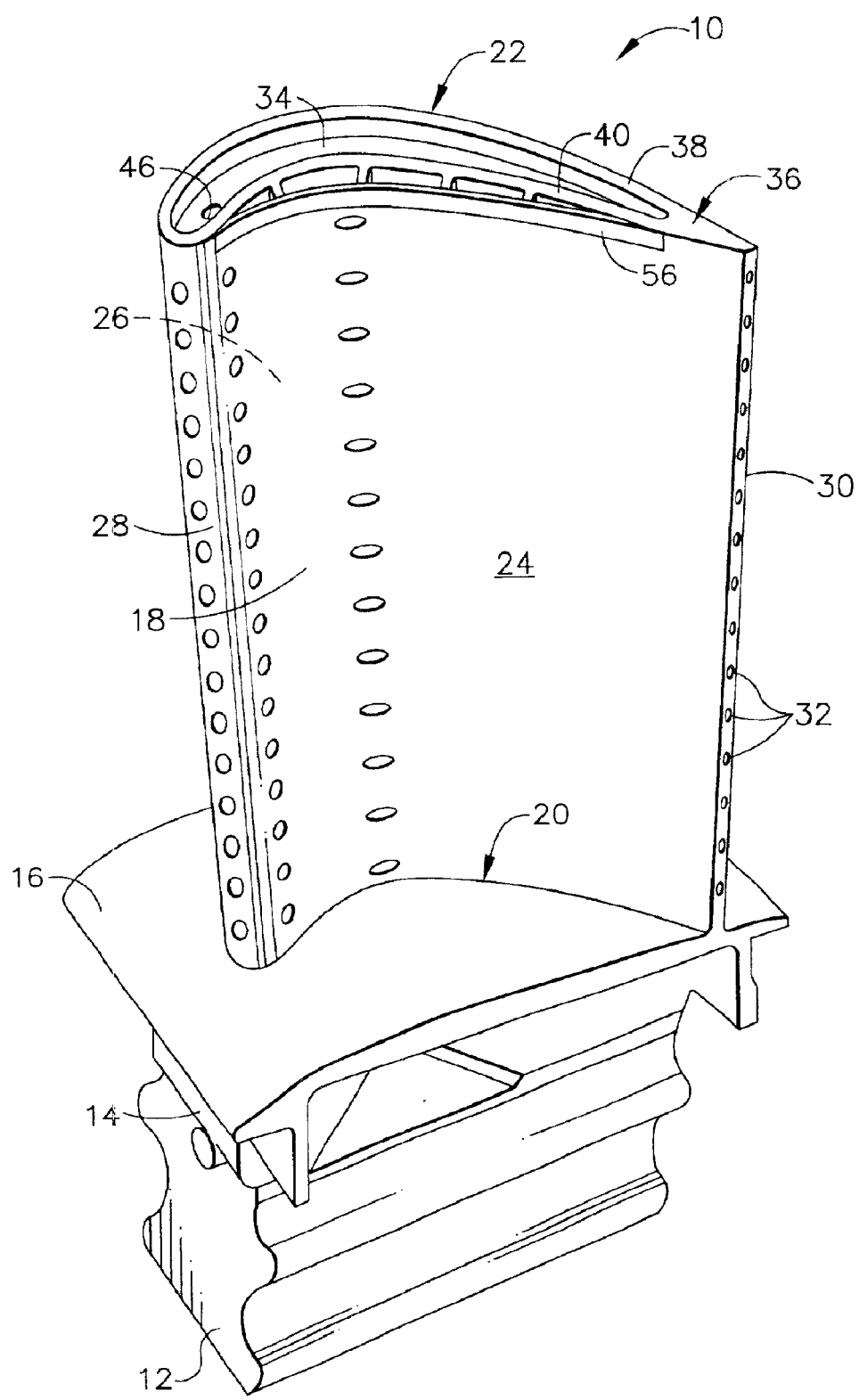
FIG. 1 is a perspective view of a high pressure turbine blade incorporating a foil-formed structure according to the present invention.

FIG. 1 depicts an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 20 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 30. The airfoil 18 may take any configuration suitable for extracting energy from the hot gas stream and causing rotation of the rotor disk. The blade 10 is preferably formed as a one-piece casting of a suitable superalloy, such as a nickel-based superalloy, which has acceptable strength at the elevated temperatures of operation in a gas turbine engine. The airfoil 18 may incorporate a plurality of trailing edge cooling holes 32, or it may incorporate a number of trailing edge bleed slots (not shown) on the pressure side wall 24 of the airfoil 18. The tip 22 of the airfoil 18 is closed off by a tip cap 34 which may be integral to the airfoil 18 or separately formed and attached to the airfoil 18. An upstanding squealer tip 36 extends radially outwardly from the tip cap 34 and is disposed in close proximity to a stationary shroud (not shown) in the assembled engine, in order to minimize airflow losses past the tip 22.

Referring now to FIGS. 2 and 3, the squealer tip 36 comprises a suction side tip wall 38 and a pressure side tip wall 40. An open plenum 41 is defined between the pressure and suction side tip walls and above the tip cap 34. One or more tip cap holes 46 extend through the tip cap 34 and supply cooling air to the plenum 41. In the illustrated embodiment the pressure side tip wall 40 is offset from the pressure side wall 24 of the blade 10 so as to form a tip shelf 42 (see FIG. 2). One or more cooling holes 44 are formed in the tip cap 34 adjacent the pressure side tip wall 40 and in fluid communication with an internal cavity 48 of the blade 10. One or more ribs 50 extend from the pressure side tip wall 40 to form a plurality of cooling channels 52. The ribs 50 may be integrally formed with the pressure side tip wall 40, for example by being machined into the wall 40 or by being integrally cast with the wall itself, or the ribs 50 may be separately fabricated and then attached to the wall 40. A notch 54 is formed in the pressure side wall 24 in order to receive an outer tip wall 56, which is made from a high temperature foil. By the use of the term "high temperature foil" it is meant a structure which is made from an alloy having improved strength and oxidation resistance over conventional superalloys at temperatures above 1093° C. (2000° F.), and capable of being formed to a thickness of about 0.51 mm (0.020 in.) or less. In the illustrated embodiment the outer tip wall 56 is about 0.12–0.254 mm (0.005–0.010 in.) in thickness. High temperature foils have an advantage over other similarly thin structures used in gas turbine applications in that they do not require large amounts of cooling air to achieve acceptable longevity. Suitable compositions of high temperature foils are described in more detail below. The outer tip wall 56 is attached to the ribs 50. Depending on the type of high temperature foil used, an interface layer 58 may be disposed between the ribs 50 and the outer tip wall 56.

In operation, the outer tip wall 56 and the pressure side tip wall 40 form a plurality of cooling channels 52. Cooling air from internal cavity 48 flows from cooling holes 44 into the cooling channels 52 where it provides convection cooling for the pressure side tip wall 40 and the outer tip wall 56. The cooling air leaving the tip cap 34 flows through the interconnected cooling channels 52 to provide convection cooling or 100% effective film cooling (i.e. film cooling free from mixing of hot flowpath gases with the cooling film). The pressure side tip wall 40 will be doubly shielded from the hot flowpath gases, by the outer tip wall 56 and by the flow of cooling air. Since the high temperature foil of the outer tip wall 56 has higher temperature capabilities than the pressure side tip wall 40, this results in a durable tip 22.

One suitable material that a high temperature foil may be formed from is a rhodium-based alloy comprising from about three atomic percent to about nine atomic percent of at least one precipitation-strengthening metal selected from the group consisting of zirconium, niobium, tantalum, titanium, hafnium, and mixtures thereof; up to about four atomic percent of at least one solution-strengthening metal selected from the group consisting of molybdenum, tungsten, rhenium, and mixtures thereof; from about one atomic percent to about five atomic percent ruthenium; up to about ten atomic percent platinum; up to about ten atomic percent palladium; and the balance rhodium; the alloy further comprising a face-centered-cubic phase and an $L1_2$-structured phase.

Another suitable material for the high temperature foil is a second rhodium-based alloy comprising rhodium, platinum, and palladium, wherein the alloy comprises a microstructure that is essentially free of $L1_2$-structured phase at a temperature greater than about 1000° C. More particularly, the Pd is present in an amount ranging from about 1 atomic percent to about 41 atomic percent; the Pt is present in an amount that is dependent upon the amount of palladium, such that: a) for the amount of palladium ranging from about 1 atomic percent to about 14 atomic percent, the platinum is present up to about an amount defined by the formula (40+X) atomic percent, wherein X is the amount in atomic percent of the palladium; b) for the amount of palladium ranging from about 15 atomic percent up to about 41 atomic percent, the platinum is present in an amount up to about 54 atomic percent; and the balance comprises rhodium, wherein the rhodium is present in an amount of at least 24 atomic percent.

The high-temperature foil compositions described above exhibit about 1.2% thermal expansion from room temperature to about 1204° C. (2200° F.), whereas typical nickel-based superalloys used to form the airfoil 18 exhibit about 1.8% thermal expansion over the same temperature range. If the outer tip wall 56 were directly attached to the ribs 50, the difference in thermal expansion between the Rh-based alloy and the superalloy would be large enough to cause concern due to stresses at the inter-mixed zone caused by differential thermal expansion. Therefore, it is desirable to incorporate an interface layer 58 between the outer tip wall 56 and the ribs 50. The interface layer 58 has a thermal expansion intermediate to that of the high temperature foil and the superalloy, for example about 1.6% over the same temperature range.

In one possible embodiment, the interface layer 58 has a composition comprising from about 51 to about 61 atomic parts chromium, from about 18 to about 26 atomic parts palladium, and from about 18 to about 26 atomic parts nickel (but the nickel and palladium need not be present in equal amounts), and optionally has an addition of from about 5 to about 8 atomic parts aluminum. Minor amounts of other elements such as impurities may be present as well. The total of all of the elements is 100 atomic percent. Nickel forms the balance of the interface layer 58. Preferably, this interface layer 58 comprises about 56 atomic parts chromium, about 22 atomic parts nickel, and about 22 atomic parts palladium.

The interface layer 58 may be applied as a solid piece and bonded to the surface of the ribs 50. The interface layer 58 may instead be supplied as a weld filler material and melted onto the surface of the ribs 50. Welding may be accomplished by any operable approach. In either case, during application and/or service an interdiffusion of the adjacent portions of the ribs 50 and the interface layer 58 may occur. This interdiffusion is desired, as it tends to raise the melting point of the interface layer 58 and improve the oxidation resistance of the interdiffused combination.

The outer tip wall 56 is applied overlying the interface layer 58. The outer tip wall 56 is preferably applied by welding or brazing. In one approach it is applied as a solid piece. The underlying interface layer 58, which has a lower melting point than either the airfoil 18 or the outer tip wall 56, is melted during the application process and then resolidified to cause bonding of the interface layer 58 to the airfoil 18 and to the outer tip wall 56. In another approach, the outer tip wall 56 is attached to the interface layer 58 by welding, for example by electron beam welding or laser welding. Any operable welding technique may be used.

Another suitable alloy for use as a high temperature foil is a solid-solution strengthened nickel-based alloy composition including about 10 to about 15 wt % Co; about 18 to about 22 wt % Cr; about 0.5 to about 1.3 wt % Al; about 3.5 to about 4.5 wt % Ta; about 1 to about 2 wt % Mo; about 13.5 to about 17.0 wt % W; up to about 0.08 wt % C; up to about 0.06 wt % Zr; up to about 0.015 wt % B; about 0.4 to about 1.2 wt % Mn; about 0.1 to about 0.3 wt % Si; and balance Ni. According to a particular composition, C is present in an amount not less than about 0.02 wt %, Zr is present in an amount not less than about 0.01 wt %, B is present in an amount not less than about 0.005 wt %. In a preferable form, the composition includes about 13.5 wt % Co; about 20 wt % Cr; about 0.8 wt % Al; about 4 wt % Ta; about 1.5 wt % Mo; about 15.5 wt % W; about 0.05 wt % C; about 0.03 wt % Zr; up to about 0.01 wt % B; about 0.7 wt % Mn; about 0.2 wt % Si; and balance Ni. The composition may contain typical impurities.

Another suitable nickel-based alloy for the high temperature foil is a alloy composition including about up to about 5.1 wt % Co; about 7.2 to about 9.5 wt % Cr; about 7.4 to about 8.4 wt % Al; about 4.3 to about 5.6 wt % Ta; about 0.1 to about 0.5 wt % Si; about 0.1 to about 0.5 wt % Hf; up to about 0.05 wt % C, up to about 0.05 wt % B; about 0 to about 2.2 Re; about 2.7 to about 4.4 wt % W; and balance Ni. Preferably, the composition contains about 3 to about 4.0 wt % Co; about 7.2 to about 8.5 wt % Cr; about 5.0 to 5.6 Ta; about 0.1 to 0.25 Hf, and about 1.0 to about 2.2 Re.

Yet another suitable nickel-based material for the high temperature foil is a alloy composition including about 2 to about 5 wt % Co; about 5 to about 15 wt % Cr; about 7 to about 10 wt % Al; about 4 to about 6 wt % Ta; about 0.5 to about 1.5 wt % Si; about 0.1 to about 0.5 wt % Hf; up to about 0.05 wt % C; up to about 0.05 wt % B; about 1.0 to about 2.0 Re; about 3 to about 4.5 wt % W; and balance Ni. Preferably, the composition contains about 3 to about 3.5 wt % Co; about 7 to about 9 wt % Al; up to about 0.03 wt % C; and up to about 0.03 wt % B.

An outer tip wall 56 formed from a nickel-based high temperature foil as described above does not require an interface layer 58, as its thermal expansion is similar to that of the airfoil 18. The outer tip wall 56 is applied to the ribs 50 as a solid piece, preferably by welding, for example by electron beam welding or laser welding. Any operable welding technique may be used.

The foil-formed structure described above could also be incorporated more generally into an airfoil wall structure 60 as shown in FIGS. 4 and 5. The airfoil wall structure 60 has a wall 62 having a plurality of ribs 64 extending therefrom. The ribs 64 may take the form of elongated lands having a rectangular cross-section, as shown in FIGS. 4 and 5, or they may be in the form of a plurality of individual upstanding elements, such as rectangular or circular cross-section posts or pins. The wall 62 itself may be a portion of a larger structure and may be formed by any known method, for example by forging or by casting. Typically, the wall 62 is cast from a conventional superalloy. The ribs 64 extend perpendicular to the surface of wall 62. The ribs 64 may be integrally formed with the wall 62, for example by being machined into the wall 62 or by being integrally cast with the wall 62 itself, or the ribs 64 may be separately fabricated and then attached to the wall 62. An outer wall 68 comprising a high-temperature foil, as described above, is attached to the ribs 64. Depending on the type of high temperature foil used, an interface layer 66 may be disposed between the ribs 64 and the outer wall 68.

The wall 62, ribs 64, and outer wall 68 cooperate to define one or more channels 70. The wall 62 thus has a first side exposed to an internal cavity 72 or a source of cooling air, a second side exposed to the flow of cooling air through the channel 70. The outer wall 68 has a first side exposed to the flow of cooling air through the channel 70 and a second side exposed to hot gas flowpath 74.

The cooling air flows through the channels 70 to provide convection cooling or 100% effective film cooling (i.e. film cooling free from mixing of hot flowpath gases with the cooling film). The wall 62 will be doubly shielded from the hot flowpath gases, by the outer wall 68 and by the flow of cooling air. Since the high temperature foil of the outer wall 68 has higher temperature capabilities than the wall 62, this results in a more durable wall structure 60.

The foregoing has described an airfoil body having a first wall including a plurality of ribs, wherein an outer wall formed of a high temperature foil is attached to the ribs so as to form a plurality of channels, and the first wall is protected from hot flowpath gases by the outer wall and by cooling air flowing through the channels. While specific embodiments of the present invention have been described, it will be apparent to those skilled in the art that various modifications thereto can be made without departing from the spirit and scope of the invention as defined in the appended claims.

What is claimed is:

1. An airfoil comprising:
    (a) an airfoil body having a root, a tip, a leading edge, and a trailing edge;
    (b) a first wall extending from the leading edge to the trailing edge;
    (c) a second wall extending from leading edge to the trailing edge, the second wall having at least one rib extending therefrom:
    (d) an outer wall disposed in spaced-apart relationship to the second wall and attached to the at least one rib, a first end of the outer wall being adjacent to the leading edge and a second end of the outer wall being adjacent to the trailing edge; and
    (e) the outer wall comprising a high temperature, rhodium-based alloy foil having a thickness of about 0.25 mm or less and including about at least 24 atomic percent of rhodium.

2. The airfoil of claim 1, and including an interface layer between the at least one rib and the outer wall that is comprised of chromium, palladium, and nickel.

3. The airfoil of claim 2 wherein the first and second walls comprise a nickel-base superalloy.

4. An airfoil comprising:
    (a) an airfoil body having a root, a tip, a leading edge, a trailing edge, a pressure side wall and a suction side wall;
    (b) a suction side tip wall disposed at the tip and extending from the leading edge to the trailing edge;
    (c) a pressure side tip wall disposed at the tip extending from the leading edge to the trailing edge, the pressure side tip wall being offset from the pressure side wall so as to define a tip shelf and having at least one rib extending therefrom;
    (d) an outer wall disposed in spaced-apart relationship to the second wall and attached to the at least one rib, a first end of the outer wall being adjacent to the leading edge and, a second end of the outer wall being adjacent to the trailing edge; and
    (e) the outer wall comprising a high temperature, rhodium-based alloy film having a thickness of about 0.25 mm or less and including at least 24 atomic percent of rhodium.

5. The airfoil of claim 4, further comprising an interface layer disposed between the rib and the outer tip wall.

6. The airfoil of claim 5, wherein the interface layer comprises chromium, palladium, and nickel.

7. The airfoil of claim 4, wherein the pressure side tip wall comprises a nickel-base superalloy.

* * * * *